United States Patent Office 2,848,344
Patented Aug. 19, 1958

2,848,344

METALLIC PIGMENT FORMULATIONS

Melvin H. Brown, Allegheny Township, Westmoreland County, Pa., assignor to Aluminum Company of America, Pittsburgh, Pa., a corporation of Pennsylvania No Drawing. Application December 9, 1953
Serial No. 397,251

4 Claims. (Cl. 106—227)

This invention relates in general to metallic pigment formulations. The metallic pigment formulations contemplated within the scope of the invention include metallic pastes, as well as metallic coating compositions, such as inks and ready mixed paints, normally made from such pastes by admixture with a vehicle, such as organic varnish.

It is well known that storage and shelf life of metallic pigment formulations are often seriously affected because of trace-quantities of water included within sealed containers of the same. The water may come from several sources, but most usually originates in the solvent and/or vehicle portions of the metallic pigment formulations. The water may also result from condensation within the containers in which the products have been sealed, or be introduced through any one or all of the ingredients making up the formulations, whether they be of metallic paste or ready mixed metallic paint or ink consistency. Regardless of the source, the presence of water or moisture in sealed containers of metallic pigment formulations is evidenced by bulging of the container walls, and in extreme cases the containers will burst with exudation and loss of their contents.

The exact chemical phenomena causing pressure build-up within sealed containers of metallic pigment formulations is not entirely known. It is believed, however, that included water or moisture reacts chemically with the finely divided metallic pigment particles in the formulations to form hydrogen gas, with resultant bulging and/or bursting of the sealed containers in which the formulations have been packaged. It has been actually observed that the destructive pressure build-up referred to is met more often in the case of metallic pigment formulations of the consistency of ready mixed metallic paints, such as aluminum paints, as distinguished from the more concentrated metallic pigment formulations of paste consistency from which ready mixed paints, inks and similar metallic coating compositions are regularly manufactured by additions thereto of suitable organic solvents, thinners and/or varnishes. Based on this observation, it is reasonable to conclude that the inclusion of water in sealed containers of metallic pigment formulations can be attributed chiefly to the vehicle or liquid portion of the formulations.

A primary object of the invention is to provide stable metallic pigment formulations characterized by substantial freedom from pressure development in sealed containers of the same, as a result of trace-quantities of included water.

A further object of the invention is to provide stable aluminum paste formulations characterized by substantial freedom from pressure development in sealed containers of the same, as a result of trace-quantities of included water.

Another object of the invention is to provide stable aluminum formulations of ready mixed paints, inks, and coating compositions of similar consistency, characterized by substantial freedom from pressure development in sealed containers of the same, as a result of trace-quantities of included water.

Other objects and advantages of the invention will present themselves on consideration of the following specification, specific examples, and appended claims.

The invention is predicated on the discovery that additions of certain nitro derivatives of aliphatic and aromatic hydrocarbons to metallic pigment formulations, in sealed containers of the same in the presence of trace-quantities of water, serve to neutralize or inhibit the objectionable pressure-developing tendencies of the water. The nitro derivatives of aliphatic and aromatic hydrocarbons found to be equivalents, and which taken singly and in combination have greatly reduced, and in many cases completely inhibited pressure development in metallic pigment formulations to which known trace-quantities of water had been added, constitute the group consisting of nitroethane, 1-nitropropane, 1-nitrobutane, 2-nitrobutane, nitrobenzene, o-nitrotoluene and 3-nitro-1,2-dimethyl benzene.

According to laboratory tests and commercial practice of the invention, in its application to aluminum pigment formulations, it has been discovered that the pressure-developing tendencies of relatively small traces of water, in amounts between 0.2 and 5 percent by weight of the aluminum flake particles in a given pigment formulation, have been greatly alleviated and in many cases completely eliminated in sealed containers of the same, by additions of one or more of the nitro derivatives of aliphatic and aromatic hydrocarbons selected from the group consisting of nitroethane, 1-nitropropane, 1-nitrobutane, 2-nitrobutane, nitrobenzene, o-nitrotoluene and 3-nitro-1,2-dimethyl benzene, in amounts between 3 and 84 percent by weight of the aluminum flake content of the formulation.

Metallic aluminum pigment formulations having ranges of composition by weight, 7 to 80 percent aluminum flakes, 0.1 to 4 percent of at least one fatty acid lubricant selected from the group consisting of stearic, palmitic, ricinoleic, oleic and lauric acids, 1 to 75 percent volatilizable hydrocarbon, and 0.25 to 51 percent of at least one inhibitor selected from the group consisting of the above named nitro derivatives of aromatic and aliphatic hydrocarbons have been satisfactorily protected against pressure build-up in sealed containers of the same in the presence of water in amounts between 0.1 to 1.5 percent of the total weight of the aluminum formulations. The composition ranges by weight of the several components of the aluminum pigment formulations herein stated have been determined to include metallic pigment formulations in the range of consistencies from concentrated metallic aluminum paste to ready mixed aluminum paint.

Unless otherwise stated, the term "volatilizable hydrocarbon," as used in the specification and claims, is meant to include commercial solvents, thinners and mixtures thereof, such as mineral spirits and high flash solvent naphtha, having a boiling point falling within the range 212 to 420° F. and regularly employed in the manufacture of paints and organic varnishes. Of course, the term "volatilizable hydrocarbon" does not include the nitro derivatives thereof.

The following examples are now given in support of the teaching and practice of the invention, compiled from laboratory and field tests.

*Example 1*

A 130 gram sample of metallic aluminum paste formulation was selected from a commercial production run of the same and was found to have the nominal composition by weight, 62.5 percent aluminum flakes, 2.5 percent stearic acid lubricant and 35 percent mineral spirits. To this sample 0.3 percent by weight water was added and thoroughly intermixed therewith. An equal weight sample of another aluminum paste formulation having the following composition by weight, 62.5 percent aluminum flakes, 2.5 percent stearic acid lubricant, 1 percent high flask solvent naphtha and 34 percent nitroethane inhibitor was adjusted by the addition of water in the amount of 0.3 percent of the weight of the paste formulation. Both samples were then charged into separate metal containers and sealed by friction caps. The sealed containers were next placed in a heated oven maintained at 125° F. for accelerated testing. The sealed containers were visually inspected periodically during the accelerated test and it was observed at the end of 24 hours that the container with the non-inhibited paste had developed internal pressure, as evidenced by pronounced outward bulging of its ends. The container with the inhibited sample of paste formulation, on the other hand, exhibited a negative pressure, that is a pressure less than atmospheric, as evidenced by its container ends being depressed inwardly. The accelerated test was interrupted at the end of 48 hours, to avoid continued bulging and eventual bursting of the container charged with non-inhibited water-containing paste, the containers removed from the oven, and pressure readings taken which revealed a pressure of 11 pounds per square inch for the normal paste formulation and a small negative pressure for the nitroethane-inhibited paste formulation.

*Example II*

A ready mixed aluminum paint of the nominal composition by weight, 14 percent aluminum flakes, 0.5 percent stearic acid lubricant, 85.5 percent organic varnish, of which 43 percent was determined to be volatile hydrocarbon in the form of a mixture of mineral spirits and high flash solvent naphtha, was adjusted by the addition of 0.5 percent 1-nitropropane inhibitor and 0.3 percent water. An identical sample of the same ready mixed paint containing the same amount of water, but without added inhibitor, was also prepared. Both samples were placed in 100 gram amounts in separate glass flasks, sealed with ground glass stoppers provided with mercury filled manometers, and charged into an electrically heated oven held at 125° F. for accelerated testing. The manometers extended through the top of the oven where they were read periodically during the test. The sealed flask with the paint sample containing water developed a pressure of 12.25 pounds per square inch after 112 hours at the testing temperature, and on cooling to room temperature showed a pressure of 8.75 pounds per square inch, at which time it was removed from the test. The sealed flask with the 1-nitropropane-inhibited paint sample developed a pressure of only 7.75 pounds per square inch after 312 hours at the testing temperature, and on cooling to room temperature showed a pressure of 4.75 pounds per square inch.

*Example III*

A ready mixed aluminum paint of nominal composition by weight, 14 percent aluminum flakes, 0.5 percent stearic acid lubricant, 85.5 percent organic varnish, of which 43 percent was determined to be volatilizable hydrocarbon in the form of a mixture of mineral spirits and high flash solvent naphtha, was adjusted by the addition of 0.25 percent o-nitrotoluene, 0.25 percent nitroethane and 0.3 percent water. An identical sample of the same ready mixed paint containing the same amount of water, but without added inhibitor, was also prepared. Both samples were charged in 100 gram amounts into separate sealed glass flasks, provided with manometers in the same manner as described for Example II, and also placed in an electrically heated oven held at 125° F. For manometers, which extended through the top of the oven, were read periodically during the test. The sealed flask charged with the water-containing sample, without the added inhibitors, developed a pressure of 11.5 pounds per square inch after 96 hours at the testing temperature, and on cooling to room temperature showed a pressure of 8.5 pounds per square inch, at which time it was removed from the test. The sealed flask charged with the inhibited sample, on the other hand, was continued in the test for 267 hours at which time it had only developed a pressure of 7.75 pounds per square inch at the testing temperature, and on cooling to room temperature showed 4.75 pounds per square inch pressure.

*Example IV*

Another ready mixed aluminum paint formulation of nominal composition by weight, 14 percent aluminum flakes, 0.5 percent fatty acid lubricant in the form of a mixture of stearic and palmitic acids, 85.5 percent organic varnish, of which 43 percent was determined to be volatilizable hydrocarbon in the form of a mixture of mineral spirits and high flash solvent naphtha, was adjusted by the addition thereto of 0.5 percent nitrobenzene inhibitor and 0.3 percent water. An identical sample of ready mixed paint containing the same amount of water, but without added inhibitor, was also prepared. Both samples were charged in 100 gram amounts into separate sealed glass flasks, as described under Example III, and similarly subjected to accelerated testing at 125° F. The sealed flask containing the inhibited sample showed a pressure of 5 pounds per square inch at the end of 456 hours at the accelerated testing temperature, and on cooling to room temperature the pressure dropped to 2.5 pounds per square inch. The sealed flask containing the uninhibited sample showed a pressure of 11.25 pounds per square inch at the end of 96 hours at the accelerated testing temperature, and on cooling to room temperature the pressure dropped to 8.25 pounds per square inch.

*Example V*

A sealed container of a well known ready mixed commercial aluminum paint, manufactured from substantially water free, uninhibited aluminum paste pigment of the composition given in Example I, and having a nominal composition by weight, 9 percent aluminum flakes, 0.3 percent fatty acid lubricant in the form of stearic acid, 49.6 percent volatilizable hydrocarbon in the form of a mixture of mineral spirits and high flash solvent naphtha and 41.1 percent non-volatile organic varnish resin, drying oils and driers, was selected on the open market within one month of its known date of manufacture. The container and its contents were found to be devoid of internal pressure, as received, and a portion of the contents was adjusted by the addition of water thereto in the amount of 0.3 percent of the weight of the selected portion of the paint formulation, sealed in a separate friction cap container and placed in storage at room temperature. The stored container was observed periodically for evidence of internal pressure and at the end of four months a pressure reading was taken on the sealed container and found to be 5 pounds per square inch. An identical sample of this water adjusted paint formulation was subjected to accelerated testing in a sealed glass flask at 125° F. in the same manner as described in the previous paint examples and was found to have developed a pressure of 8 pounds per square inch after 48 hours at the testing temperature. On cooling to room temperature, the pressure was determined to be 5 pounds per square inch, or the same pressure as recorded for this same paint formulation at the end of four months' storage at room temperature.

*Example VI*

Another container of the same commercial ready mixed paint formulation discussed in Example V was obtained and found to be devoid of internal pressure, as received, within one month of its known date of manufacture. A portion of the contents of this container was adjusted by the addition thereto of one ounce per gallon of the inhibited, substantially water free aluminum paste formulation of Example I. The inhibited portion of the paint formulation was then adjusted by the addition of water in the amount of 0.3 percent of its weight and 100 grams of the same placed in a sealed glass flask held at 125° F. for accelerated testing in the same manner as previously described. At the end of 842 hours in the accelerated test, the sealed flask containing the paint formulation was found to have developed a pressure of 2 pounds per square inch, and on cooling to room temperature the pressure dropped to 1 pound per square inch below atmospheric pressure. An identical portion of the water containing, inhibited paint formulation was also stored at room temperature in a friction cap container and inspected periodically over a period of four months, at the end of which time a pressure reading taken on the sealed container revealed a negative pressure of 2 pounds per square inch below atmospheric pressure.

Experience based on actual observation and tests, in addition to the tests reported in the six examples given above, has established the fact that sealed containers of aluminum pigment formulations of paste and paint consistency, which develop internal pressure below 5 pounds per square inch at any time during their expected life under normal storage conditions at room temperatures, are satisfactory and acceptable stable commercial products. The testing procedure reported in the above examples has been devised and is an accepted laboratory technique for obtaining accelerated results, which on comparison with internal pressure readings recorded for aluminum pigment formulations in sealed containers under normal room temperature storage, has clearly established that the named inhibitors meet, and in many cases have extended, the life expectancy of aluminum pigment formulations in sealed containers in the presence of trace-quantities of water.

The inhibitors selected from the named nitro derivatives of aliphatic and aromatic hydrocarbons, found to be successful in the practice of the invention, may be introduced into the aluminum pigment formulations at any time during or after their manufacture so long as the formulations incorporate at least one of the named inhibitors at the time they are packaged in sealed containers. This permits the manufacture and packaging of inhibited aluminum paste formulations for subsequent admixture with organic varnish in the manufacture of ready mixed aluminum paints and coating compositions, which will in turn be inhibited against pressure development in sealed containers of the same. Ready mixed aluminum paint formulations may also be prepared from dry powder or uninhibited paste formulations and one or more of the named inhibitors added to the paint at the time the same is packaged in sealed containers. A further commercial adaptation of the invention comprises the manufacture of an aluminum paste formulation fortified with an excess of inhibitor for addition to and adjustment of ready mixed aluminum paints, which had not been previously inhibited, as described under Example VI.

In one preferred commercial practice of the invention aluminum paste formulations characterized by their stability and substantial freedom from pressure development in sealed containers of the same in the presence of water in amounts between 0.1 to 1.5 percent of the weight of the paste formulations, under normal room temperature storage conditions, are definable in terms of comprisng 45 to 80 percent aluminum flakes, 0.2 to 4 percent of at least one fatty acid selected from the group consisting of stearic, palmitic, oleic, ricinoleic and lauric acids, 1 to 5 percent volatilizable hydrocarbon, and 30 to 51 percent of one or more of the nitro derivatives of aliphatic and aromatic hydrocarbons selected from the group consisting of nitroethane, 1-nitropropane, 1-nitrobutane, 2-nitrobutane, nitrobenzene, o-nitrotoluene and 3-nitro-1,2-dimethyl benzene.

In another preferred commercial practice of the invention ready mixed aluminum paint formulations manufactured from dry powder or aluminum paste formulations, whether initially inhibited or not, which paint formulations are characterized by their stability and freedom from pressure development in sealed containers of the same in the presence of water in amounts between 0.1 to 1.5 percent of the weight of the paint formulations, under normal room temperature storage conditions, are definable in terms of comprising 7 to 21 percent aluminum flakes, 0.1 to 1 percent of at least one fatty acid lubricant selected from the group consisting of stearic, palmitic, oleic, ricinoleic and lauric acids, 20 to 75 percent volatilizable hydrocarbon, 20 to 64 percent organic varnish resin, drying oils and driers, and 0.25 to 1 percent of one or more of the nitro derivatives of aliphatic and aromatic hydrocarbons selected from the group consisting of nitroethane, 1-nitropropane, 1-nitrobutane, 2-nitrobutane, nitrobenzene, o-nitrotoluene and 3-nitro-1,2-dimethyl benzene.

In all of the aluminum pigment formulations contemplated hereinabove and in the claims, 1 to 38 percent of the aluminum flakes may be replaced with an inert pigment, such as silica gel, alumina, or similar inert filler material, without in any way detracting from the benefits and advantageous results of the added inhibitors. It is also intended and understood that other components may be added to the aluminum pigment formulations of the invention providing their addition has no deleterious effect on the inhibitors and resulting compositions of matter. Chemically pure or technical grades of the named nitro derivatives of aliphatic and aromatic hydrocarbons may be employed as the inhibitors without in any way affecting the results of the invention.

What is claimed is:

1. Metallic aluminum pigment formulations characterized by substantial absence of development of pressure in sealed containers of the same, said formulations consisting essentially of from 7 to 80 percent aluminum flakes, from 0.1 to 4 percent of at least one fatty acid lubricating agent selected from the group consisting of stearic, palmitic, oleic, ricinoleic and lauric acids, the total amount of said acids not exceeding 4 percent, from 1 to 75 percent volatilizable hydrocarbon, from 0.25 to 51 percent of at least one inhibitor selected from the group of nitro derivatives of aliphatic and aromatic hydrocarbons consisting of nitroethane, 1-nitropropane, 1-nitrobutane, 2-nitrobutane, nitrobenzene, o-nitrotoluene and 3-nitro-1,2-dimethyl benzene, the total amount of said nitro derivatives of aliphatic and aromatic hydrocarbons not exceeding 51 percent, and water in amounts of 0.1 to 1.5 percent by weight of the formulations.

2. Metallic aluminum pigment formulations characterized by substantial absence of development of pressure in sealed containers of the same, said formulations consisting essentially of from 7 to 80 percent aluminum flakes, 0.1 to 4 percent of at least one fatty acid lubricant selected from the group consisting of stearic, palmitic, oleic, ricinoleic and lauric acids, the total amount of said acids not exceeding 4 percent, from 1 to 75 percent volatilizable hydrocarbon, from 3 to 84 percent by weight of the aluminum flakes of at least one inhibitor selected from the nitro derivatives of aliphatic and aromatic hydrocarbons consisting of nitroethane, 1-nitropropane, 1-nitrobutane, 2-nitrobutane, nitrobenzene, o-nitrotoluene and 3-nitro-1,2-dimethyl benzene, the total amount of said nitro derivatives of aliphatic and aromatic hydrocarbons not exceeding 51 percent of the total weight of the formulations, and water in amounts between 0.2 and 5 percent by weight of the aluminum flake particles in the formulations.

3. Metallic aluminum paste formulations characterized by substantial absence of development of pressure in sealed containers of the same, said formulations consisting essentially of from 45 to 80 percent aluminum flakes, from 0.2 to 4 percent of at least one fatty acid lubricating agent selected from the group consisting of stearic, palmitic, oleic, ricinoleic and lauric acids, the total amount of said acids not exceeding 4 percent, from 1 to 5 percent volatilizable hydrocarbon, from 30 to 51 percent of at least one inhibitor selected from the group of nitro derivatives of aliphatic and aromatic hydrocarbons consisting of nitroethane, 1-nitropropane, 1-nitrobutane, 2-nitrobutane, nitrobenzene, o-nitrotoluene and 3-nitro-1,2-dimethyl benzene, the total amount of said nitro derivatives of aliphatic and aromatic hydrocarbons not exceeding 51 percent, and water in amounts from 0.1 to 1.5 percent by weight of the paste formulations.

4. Ready mixed metallic aluminum paint formulations characterized by substantial absence of development of pressure in sealed containers of the same, said ready mixed paint formulations consisting essentially of 7 to 21 percent aluminum flakes, from 0.1 to 1 percent of at least one fatty acid lubricating agent selected from the group consisting of stearic, palmitic, oleic, ricinoleic and lauric acids, the total amount of said acids not exceeding 1 percent, from 20 to 75 percent volatilizable hydrocarbon, from 20 to 64 percent organic varnish resin, drying oils and driers, from 0.25 to 1 percent of at least one inhibitor selected from the group of nitro derivatives of aliphatic and aromatic hydrocarbons consisting of nitroethane, 1-nitropropane, 1-nitrobutane, 2-nitrobutane, nitrobenzene, o-nitrotoluene and 3-nitro-1,2-dimethyl benzene, the total amount of said nitro derivatives of aliphatic and aromatic hydrocarbons not exceeding 1 percent, and water in amounts of 0.1 to 1.5 percent by weight of the paint formulations.

References Cited in the file of this patent

UNITED STATES PATENTS

| | | |
|---|---|---|
| 2,178,181 | McMahan | Oct. 31, 1939 |
| 2,240,151 | Wampner | Apr. 29, 1941 |
| 2,280,135 | Ward | Apr. 21, 1942 |
| 2,457,591 | Moore | Dec. 28, 1948 |
| 2,587,268 | Roberts | Feb. 26, 1952 |